United States Patent
Rantalahti (10) Patent No.: US 7,690,042 B2
(45) Date of Patent: Mar. 30, 2010

(54) METHOD AND DEVICE FOR SHARING OF CONTENT PROTECTED BY DIGITAL RIGHTS MANAGEMENT

(75) Inventor: Antti Rantalahti, Espoo (FI)

(73) Assignee: Nokia Corporation, Espoo (FI)

( * ) Notice: Subject to any disclaimer, the term of this patent is extended or adjusted under 35 U.S.C. 154(b) by 622 days.

(21) Appl. No.: 10/580,893

(22) PCT Filed: Dec. 8, 2003

(86) PCT No.: PCT/IB03/05750

§ 371 (c)(1),
(2), (4) Date: Jan. 30, 2007

(87) PCT Pub. No.: WO2005/057846

PCT Pub. Date: Jun. 23, 2005

(65) Prior Publication Data

US 2007/0283420 A1 Dec. 6, 2007

(51) Int. Cl.
| G06F 7/04 | (2006.01) |
| G06F 17/30 | (2006.01) |
| G06F 15/167 | (2006.01) |
| G06F 15/177 | (2006.01) |
| G06F 15/16 | (2006.01) |
| H04N 7/16 | (2006.01) |
| G06F 7/00 | (2006.01) |
| G06F 12/00 | (2006.01) |

(52) U.S. Cl. .................. 726/27; 726/26; 709/216; 709/220; 709/248; 707/8; 707/204

(58) Field of Classification Search .................. 726/27, 726/36; 709/216, 220, 248; 707/8, 204
See application file for complete search history.

(56) References Cited

U.S. PATENT DOCUMENTS

| 5,978,919 | A | * | 11/1999 | Doi et al. ...................... 726/36 |
| 6,901,434 | B1 | * | 5/2005 | Lunsford et al. ............ 709/216 |
| 7,222,139 | B2 | * | 5/2007 | Mau ........................... 707/204 |
| 7,346,616 | B2 | * | 3/2008 | Ramanujam et al. ........... 707/8 |
| 2002/0159596 | A1 | | 10/2002 | Durand et al. |
| 2003/0174838 | A1 | | 9/2003 | Bremer |
| 2003/0220881 | A1 | | 11/2003 | Pirhonen et al. |
| 2003/0226012 | A1 | | 12/2003 | Asokan et al. |
| 2005/0097225 | A1 | * | 5/2005 | Glatt et al. .................. 709/248 |

FOREIGN PATENT DOCUMENTS

| WO | WO 02/23311 A2 | 3/2002 |
| WO | WO 03/003173 A1 | 1/2003 |

OTHER PUBLICATIONS

PCT International Search Report of International Application No. PCT/IB2003/005750, Date of Completion of Search—Jun. 11, 2004.

* cited by examiner

Primary Examiner—Shin-Hon Chen
(74) Attorney, Agent, or Firm—Locke Lord Bissell & Liddell LLP (57) ABSTRACT

The present invention provides methods and devices allowing a secure way of sharing DRM-protected content. A content holder may share the content under certain restrictions. These restrictions include range-based, time-based or usage-based limitations. The invention offers a secure sharing method preventing copyright violations and preserving the copyright owners control over the content use, while also offering new marketing possibilities to him.

20 Claims, 4 Drawing Sheets

METHOD AND DEVICE FOR SHARING OF CONTENT PROTECTED BY DIGITAL RIGHTS MANAGEMENT

The present invention relates to a method and a device for secure sharing of content that is protected by digital rights management (DRM). Particularly it relates to a method and a device for allowing the sharing of content while at the same time preserving full control over the use of the content.

Though the spreading use of media content in digital form has many advantages regarding among others quality and ease of use, it also poses one problem, that resides in the loss less duplication associated with digital content. Since it is easy to copy digital information, copyright infringement has become a great threat to content owners. At first there were at least some technical restrictions preventing wide-spread copyright violations. But with the availability of cheap CD-writers, highly improved compression technologies like MP3 and high-bandwidth network connections like xDSL, violating an owners copyright has become an easy task. Especially with the upcoming of so called peer-to-peer filesharing systems on the internet, with Napster being the most prominent example, the uncontrolled illegal distribution of content became a mass phenomena.

Thus a protection for digital content was developed, the digital rights management DRM. DRM utilizes encryption for the protection of media content. The raw digital information is encrypted with a special key, and usually specifically encrypted for a predetermined hardware or software player (portable mp3-player/media player software) containing a corresponding decryption key. Thus only the person in possession of the unique hardware or software player device is enabled to use the content. The content may not any longer be duplicated for use with other player devices. So the one in "possession" of a certain content has to be rather called a "holder", since he/she does not own the content itself anymore, but is granted the right for playback. The real "owner" of the content is for example the corresponding record company. This is in contrast to the traditional way, where a consumer owns the content itself, in form of a physical storage medium, and thus implicitly the right for playback.

This makes is possible to control access to an mp3-compressed song, a digital video order an e-book. Other possibilities are the control over the number of times someone may use a certain content or if and how many times he/she is allowed to duplicate it. With regard to protection against copyright violation this is a quite satisfying solution. But on the other hand it strongly restricts another feature of digital content, that is the ease of use.

Another use of DRM shall also be mentioned, that is watermarking. With such a unique watermark implemented in every copy of the digital content itself, that may not be removed, it is possible to determine from which source a song, a video or the like originated. It is thus possible to trace a copyright violation back to the (first) violator. Or the watermark may be used for building statistics, for example how many times a certain song has been listened to or been broadcasted. This can be very useful for marketing purposes. Watermarking can of course be combined with the encryption of content.

US 2002/0159596 A1 describes an arrangement in which a personal trusted device is used to deliver the key for decryption of digital content to a rendering, i.e. playback, machine. Here only one rendering device may be used at a time, though this need not be a unique device, so the DRM is not shared, but rather "portable".

WO 02/23311 discloses a method and system for distributing digital information. Here only the access to content is being distributed. The consumer does not obtain a copy of the content itself, but the right for playback of the information over a network.

With the necessary coupling between DRM-protected content and the related hardware or software utilized for playback, it is not possible to lend a certain song to a friend. If media content were bound to a certain physical storage medium and could not be duplicated that would not pose a problem. Lending the physical medium and thus implicitly the right to use the content would ensure that only one person at a time had access to the media content. While this is not technically feasible anyway, it also prevents more than one person to enjoy the respective content. On the other hand the DRM-protection makes it impossible to lend content to some other person. At least not without registration of the content, which is quite uncomfortable or even impossible, provided an internet connection or the like is necessary but not available to the person having borrowed the content. Access of more then one person is not possible anyway.

Mobile personal devices along with portable players in many forms, also mobile phones with playback functions, have an increasing importance as platforms for digital media playback. Since those are primarily designed as personal devices for just one person it is often difficult to listen to and/or watch the playback of such a device with more than one person at a time. Traditionally and also possible with DRM is the sharing of the physical outcome of the playback, i.e. the rendered content, for example by utilizing a second earphone set. Such wired sharing requires the necessary equipment, eventually time for setup, and of course there are strict limitations concerning for example the range limit caused by the length of a respective cable. Wireless sharing brings up problems with bandwidth, since conventional wireless technologies in portable devices do not offer the capacity for playback of raw, i.e. uncompressed, content. This becomes especially stringent when the number of listeners or viewers increases. Also this is a method not compliant with DRM, since raw digital information is not protected against illegal duplication and shall therefore not be shared or distributed, respectively.

Until now a compromise had to be made between protection against copyright violation and ease of use and ease of access to digital content, respectively. While security of content is achievable with DRM, a desired comfortable way for sharing content is thus prevented. On the other hand, conventional methods for sharing content do not offer any protection against copyright violation, and may also cause bandwidth problems.

So there obviously is a need for ways to share digital content in a secure fashion without excessive restrictions to users, but at the same time offering protection against copyright infringement.

The present invention provides methods and devices for safe and comfortable sharing of DRM-protected content while not affecting the copyright. It also provides methods and devices providing enhanced control over the use of a content for the copyright owner.

In the following description of the present invention, the term "owner" refers to the copyright owner, e.g. a record company, "holder" refers to a customer possessing the rights to use a certain content, i.e. a person having purchased those right from the record company, and "listeners" refers to persons that do not personally own rights, but are allowed to access the content under certain limitations. Content may for example be, but is not limited to, songs, videos, books and computer games.

According to a first aspect of the present invention, a method for sharing content protected by digital rights management (DRM) between a first mobile electronic terminal device and a second mobile electronic terminal device is provided. The first mobile electronic terminal device is authorized for accessing the content. A request for sharing the content from the second mobile electronic terminal device is received. The request is answered by sending a confirmation to the second mobile electronic terminal device about authorization of the first mobile electronic terminal device to access the content and sending a data signal based on the authorization to the second mobile electronic terminal device and indicative of at least one condition the second mobile electronic terminal device has to meet in order to be authorized for accessing the content.

It is preferred that the content is provided in the first mobile electronic terminal device, and that the content is sent to the second mobile electronic terminal device. This corresponds to a normal sharing of media.

It is preferred that a key for accessing the content is provided in the first mobile electronic terminal device. A clock synchronisation signal is received from the second mobile electronic terminal device. A plurality of keys $k_i$ is generated, derived from the key, wherein the keys $k_i$ are suitable to partially access the content. The keys $k_i$ are sent to the second mobile electronic terminal device in accordance with the clock synchronisation signal. That is a very sophisticated method allowing better protection against eavesdroppers.

According to a second aspect of the present invention a method for sharing content protected by digital rights management DRM between a first mobile electronic terminal device and a second mobile electronic terminal device is provided. The first mobile electronic terminal device is authorized for accessing the content. A request for sharing of the content is sent to the first mobile electronic terminal device. In response to the request a confirmation about authorization of the first mobile electronic terminal device and a data signal indicative of at least one condition the second mobile electronic terminal device has to meet in order to be authorized to access the content are received from the first mobile electronic terminal device. Access to the content is authorized based on the confirmation and the condition being met.

It is preferred that the content is received from the first mobile electronic terminal device. This is a convenient way to download the content.

It is preferred that the confirmation comprises a key for accessing the content. If the key is not permanently present but only received on demand, security against malicious use is enhanced.

It is preferred that authorization of access to the content is denied if the condition is not met for a predetermined time. For example, if the condition is not met for more than 10 seconds, authorization could be denied. Such a time-based condition is easy to control.

It is preferred that authorization of access to the content is denied if not meeting the condition has occurred a predetermined number of times. If the condition is a wireless connection, a number of signal dropouts could be tolerated, while at the same time ensuring that a connection is alive by denying access if the connection gets to bad.

It is preferred the request comprises a user identification of the second mobile electronic terminal device. That enables the holder to choose if he wants to share with the specific user. Also this enables the holder to gather data about possible users.

It is preferred that the at least one condition is the second mobile electronic terminal device having a network connection with the first mobile electronic terminal device. This is an easy to control implementation of a condition.

It is preferred that the network connection is a wireless connection. The advantages of wireless connections should be self evident.

It is preferred that the at least one condition is the second mobile electronic terminal device not exceeding a predetermined number of accesses to the content. This would make it possible to grant only a small number of accesses.

It is preferred that the at least one condition is the second mobile electronic terminal device not exceeding a predetermined time of access to the content. That would offer the possibility to restrict the listeners access to a certain time, e.g. the length of a song.

According to a third aspect of the present invention a method for sharing content protected by digital rights management (DRM) between a first mobile electronic terminal device and a second mobile electronic terminal device is provided. The first mobile electronic terminal device is or may be authorized for accessing the content, and the mobile electronic terminal devices are part of a location based service network. A request for sharing of the content is received from the second mobile electronic terminal device. The request contains an identification of the second mobile electronic terminal device and an identification of the first mobile electronic terminal device. The location of the first mobile electronic terminal device and the location of the second mobile electronic terminal device in the network are compared based on the identifications. An authorization to access the content is sent to the second mobile electronic terminal device if the locations of the two mobile electronic terminals are in a predetermined area.

It is preferred that the authorization comprises a key to access the content. The advantage of non-permanently present keys has been discussed earlier.

It is preferred that cyclic repeats of the comparing of the locations of the two mobile electronic terminals are performed, and authorization to access the content is denied if the locations of the two mobile electronic terminals are not in a predetermined area. Cyclic checking ensures that access is restricted to users being in the predetermined area.

According to a fourth aspect of the present invention a software tool is provided, comprising program code means stored on a computer readable medium for carrying out the aforementioned methods of the invention, when the software tool is run on a computer or network device. A special software is essential for the invention, to provide a closed system on either side of the process.

According to a fifth aspect of the invention a computer program product is provided, comprising program code means stored on a computer readable medium for carrying out the aforementioned methods of the invention, when the program product is run on a computer or network device.

According to a sixth aspect of the invention a computer program product is provided comprising program code, downloadable from a server for carrying out the aforementioned methods of the invention, when the program product is run on a computer or network device.

According to a seventh aspect of the invention a computer data signal is provided, embodied in a carrier wave and representing a program that instructs a computer to perform the steps of the aforementioned methods of the invention.

According to an eight aspect of the invention a mobile electronic terminal device for sharing content protected by digital rights management (DRM) with a second mobile electronic terminal device is provided. The mobile electronic terminal device may be authorized for accessing the content. The device comprises a component adapted for transceiving data and a component for generating a data signal. The data signal generating component is adapted to generate a data signal indicative of at least one condition the second mobile electronic terminal device has to meet to be authorized for access to the content. The data signal is also based on the authorization of the mobile electronic terminal device to access the content. The transceiving component is adapted to send the data signal to the second mobile electronic terminal device.

It is preferred that the device further comprises a component adapted to send the content to the second mobile electronic terminal device. This corresponds to a normal sharing of media and is convenient for participants. It could for example be a direct cable connection.

It is preferred that a key for accessing the content is provided in the first mobile electronic terminal device. The transceiving component is adapted to send the key to the second mobile electronic terminal device.

It is preferred that the device further comprises a component adapted to generate a plurality of keys $k_i$ derived from the key. Each of the keys $k_i$ is suitable to partially access the content. The transceiving component is adapted to receive a clock synchronisation signal from the second mobile electronic terminal device and to send the keys $k_i$ to the second mobile electronic terminal device in accordance to the clock synchronisation signal. This is a setup offering increased security against malicious use and eavesdroppers.

According to a ninth aspect of the invention a mobile electronic terminal device for sharing content protected by digital rights management (DRM) from a first mobile electronic terminal device is provided. The first mobile electronic terminal device may be authorized for accessing the content. The device comprises a component adapted for transceiving data and an authorization component. The transceiving component is adapted to receive a data signal indicative of a condition, and the authorization component is adapted to authorize access to the content based on the condition being met.

It is preferred that the device further comprises a component adapted to receive the content. The advantages of this have been discussed before.

It is preferred that the transceiving component is adapted to receive the key.

It is preferred that the device further comprises a component adapted to send a clock synchronisation signal. The transceiving component is adapted to receive keys $k_i$ in accordance to the clock synchronization signal and the authorization component is adapted to authorize access to the content based on the keys $k_i$. This provides a sophisticated way of sharing.

It is preferred that the transceiving component comprises a local area network transceiver. As mentioned before, wireless connections are a convenient way for implementing necessary connections between mobile devices. Especially range-limited local area network connection provide many advantages.

It is preferred that the transceiving component comprises a wide area network transceiver. The range may be enhanced by using such a transceiver type.

In the following description of the invention, the term "holder" refers to a person owning the rights for accessing the content or his mobile electronic terminal device, respectively. Accordingly, "listener" refers to a person wanting to get shared the rights for accessing the content or his mobile electronic terminal device, respectively. The term "first mobile electronic terminal device" relates to a device belonging to a holder, while "second mobile terminal device" relates to a device belonging to a listener.

Figure 1:
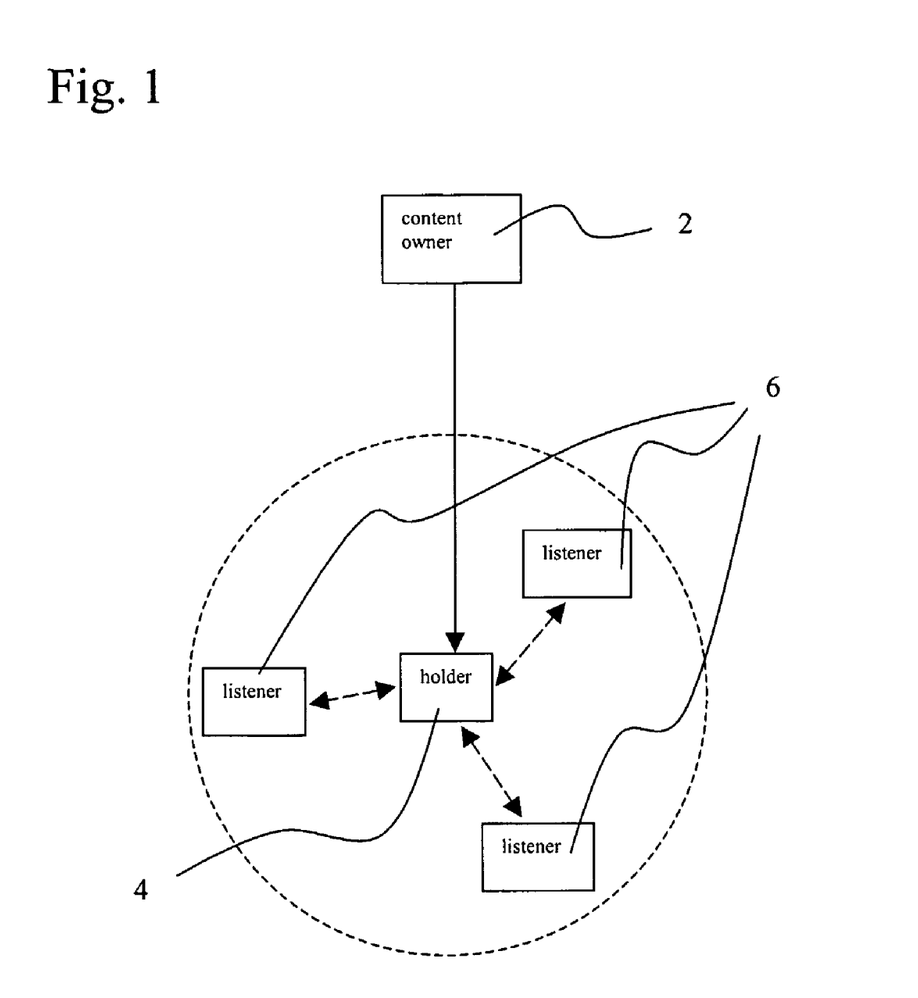
FIG. 1 is a schematic illustration of an embodiment of the invention.

In FIG. 1 sharing of DRM rights according to the invention is schematically illustrated. An owner 2, for example a record company, is in possession of the copyright of a certain content, for example a song. The owner 2 has sold the right for playback of the song to a customer, a holder 4. The holder 4 is in possession of the DRM-protected song, meaning that he physically owns the encrypted song data and a corresponding key to decrypt and play back the song, in other words, these are stored in a first mobile electronic terminal device belonging to him. Holder 4 can now enable a number of listeners 6 to listen to the song. The listeners 6 do not personally own rights for playback of the song, but are "lend" the rights to do so. In order to be lent the content (indicated by dotted arrows from holder 4 to listeners 6), the listeners 6 request the content from the holder 4, meaning that every listener 6 sends a request with a second mobile electronic terminal device belonging to him to the first mobile electronic terminal device of the holder 4. A right for access is lent to them by the holder 4 based on a condition. A possible condition is for a listeners second mobile electronic terminal device to be located in a certain distance of the first mobile electronic terminal device of the holder 4, indicated by the dotted circle. Only when being inside this circle, the listeners 6 are allowed to access the content shared by the holder 4.

Figure 2:
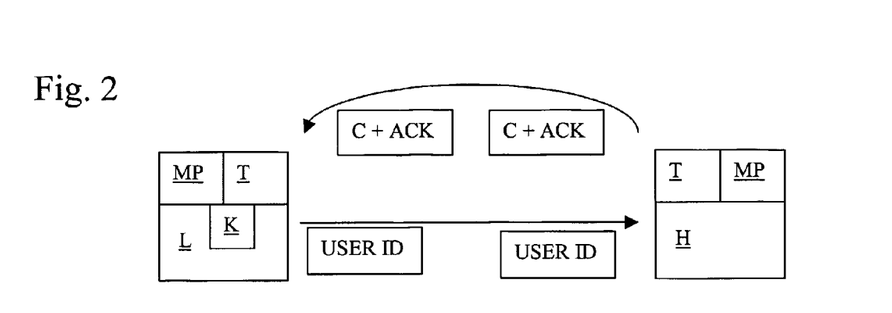
FIG. 2 illustrates a simple inventive sharing situation, wherein the part of the holder is depicted on the right side, and that of the listener on the left side.

In FIG. 2 a simple sharing situation is depicted. The devices of the holder H and the device of the listener L both comprise a mediaplayer MP and a transceiving component T that is adapted to send and receive data. In this case the listener L has some kind of media content already stored in his mobile electronic terminal device and a key K suitable to access that content thus enabling the media player MP for playback of the content. By sending a USER ID the listener L requests to have the content, or better the rights to access it, shared with him. This USER ID contains an indication of the listener L. The device of the holder H sends a secure acknowledgement ACK and a data signal indicative of a condition C to the listener L. The condition C may for example be that a connection between listener L and holder H is active, like a bluetooth or an other wireless connection. Other possibilities are to restrict the listeners playback to a predetermined number of playbacks or a time interval. In the latter cases the connection may be terminated after playback has started. By receiving the ACK the media player MP of the listener L is informed that holder H has the rights for playback.

Provided the received condition C is met by the listener L, the media player MP activates the key and allows the playback. This rather simple setup makes sharing very easy, but precautions against copyright violation have to be made. Since the listeners device has the decryption key, it is necessary that the media player MP ensures that playback is only possible when having received confirmation that holder H owns the corresponding rights and condition C is fulfilled. That also means that the player of the holder H has to be able to pass the rights to listeners L in a secure way, e.g. by using known encryption techniques. It would be advantageous to have the decryption key integrated into the listeners media player, so that the key cannot be extracted and used without permission. Also it has to be ensured that the ACK signal is authentic and may not be faked to pretend having the rights for playback of the content. That may be done utilizing the USER ID to generate a unique ACK only valid for the specific listener. Known asymmetrically encryption methods are suitable for that. This kind of setup would be preferred for a situation in which the (protected) content is downloaded into the listeners device externally from a data storage of the copyright owner, e.g. from a webpage. Also this setup has the advantage of reduced data transfer between holder H and listener L.

Figure 3:
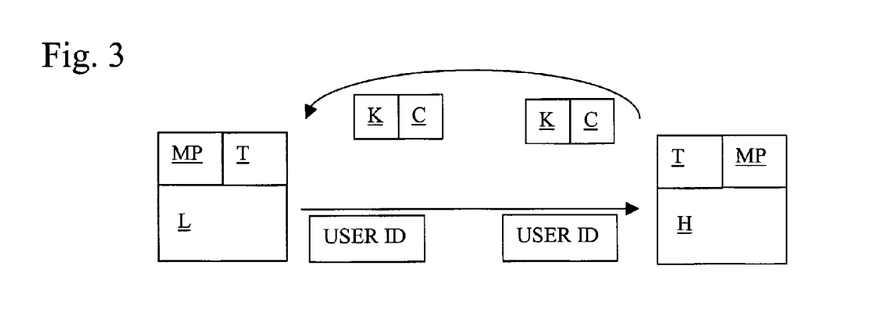
FIG. 3 illustrates a typical inventive sharing situation, wherein the part of the holder is depicted on the right side, and that of the listener on the left side.

In FIG. 3 a typical setup is illustrated. It is assumed that a listener L has already downloaded a protected content into his device. This can be done via a wired (USB/Firewire or the like) or wireless (bluetooth/WLAN/infra-red/RFID etc.) connection with the device of a holder H. Again by sending a USER ID he requests sharing of the content. If the content download was performed directly from the holder H, holder H already knows which content is requested to be shared. In any other case the request must also contain an indication of the content for identification purposes. Holder H now sends a key K suitable to access the content and a data signal indicative of a condition C, similar to the situation illustrated in FIG. 2. After the listener L has received key K and the data signal indicative of a condition C his device checks if the condition is fulfilled and then allows playback of the content using the key. This setup requires similar measures to prevent violation of the copyright. If the listener L fails to meet the condition C, the key K should of course be deleted from his device, to prevent further use without permission.

A compromise between security and usability has to be achieved in a connection-based condition situation. Since wireless connections, which are the most comfortable ones to use, are likely to show short dropouts even when holder and listener are still in the desired range, a threshold value has to be set. This will mostly be a time interval. If the connection is re-established within the time interval, sharing continues. Otherwise, if the preset time is exceeded, playback may immediately be prohibited, and a received key may be deleted to prevent malicious use. However, other conditions, like a number of accesses or a time of access, should be strictly observed.

Figure 4:
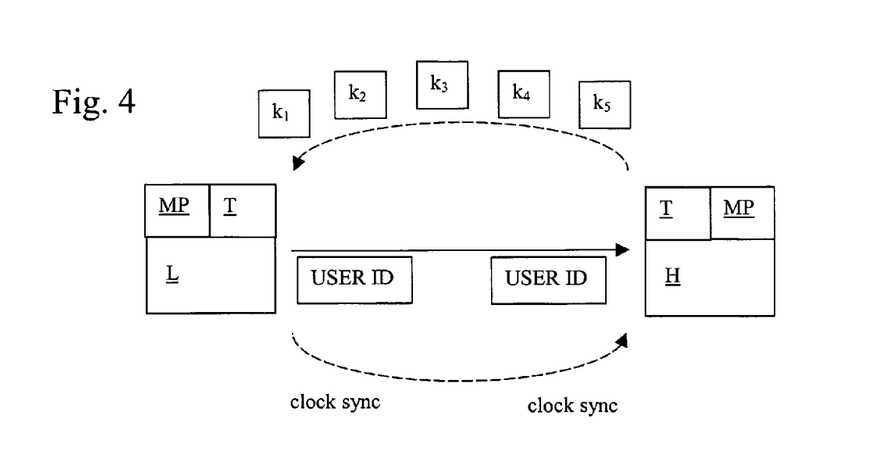
FIG. 4 illustrates a complex inventive sharing situation, wherein the part of the holder is depicted on the right side, and that of the listener on the left side.

FIG. 4 shows a more complex setup with enhanced security against eavesdropping. Again it is assumed that a content has already been transferred into the device of a listener L. With a USER ID eventually also containing an indication of the respective content sharing is requested from a content holder H. The device of holder H now generates small unique time based keys $k_i$ ($k_1, \ldots, k_5$) from his own decryption key. Each of those is sent to the listener L, and allows decryption of only small parts of the content. To achieve this, holder H must perform a synchronisation to the clock of the device of listener L. Since possible eavesdroppers are not synchronized in that fashion, they may not participate in the sharing. A data signal indicative of a condition similar to the situation of FIG. 2 is not necessary here, because playback is only allowed as long as listener L stays in range and connected for clock synchronisation and holder H keeps sending the keys $k_i$ ($k_1$, $k_2$, $k_3$, $k_4$, $k_5$). Thus this is a secure and sophisticated way of sharing DRM-protected content, provided the devices involved have the processing and signalling capabilities that are required.

Figure 5:
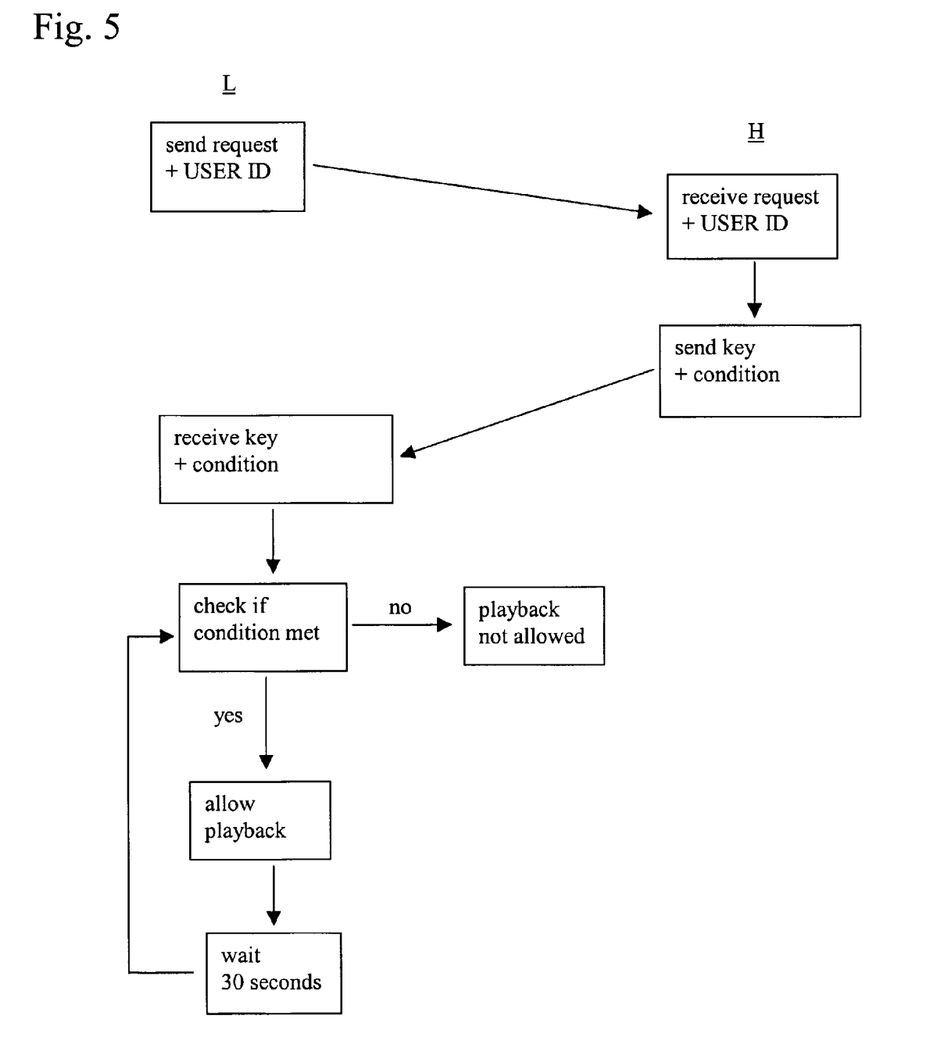
FIG. 5 is a flow-chart of an inventive sharing process, wherein the part of the holder is depicted on the right side, and that of the listener on the left side.

In FIG. 5 a typical inventive sharing process is shown as a flow chart:

First the listener L sends a request for a certain content and his USER ID to a holder H of the content. After receiving the request the holder sends the decryption key for the content and a condition to the listener. After receiving key and condition the listeners device checks if the condition is met. If that is the case, playback is allowed and the listener may use the content. After a time of 30 seconds has passed the check for the condition is repeated. If at some time the condition is not met anymore, playback is prohibited and the listener may not use the content anymore.

Figure 6:
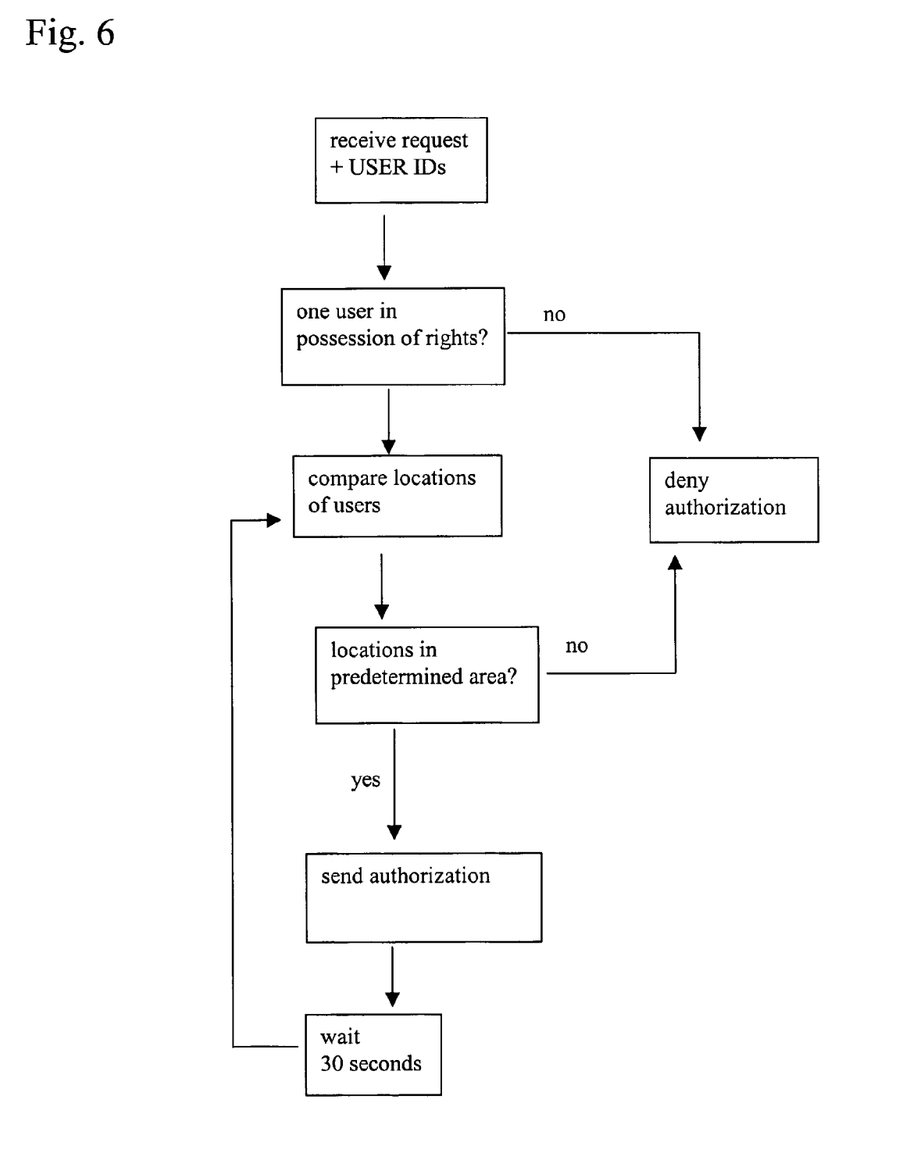
FIG. 6 is a flow-chart of another inventive sharing process.

In FIG. 6 another sharing process according to the invention is shown as a flow-chart. This sharing process is based on a location-based service network, like a GSM network. Location-based means that the locations of participants in the network, i.e. users or subscribers, may be determined. The idea of this embodiment of the invention is to grant access to content to listeners being in close proximity to a holder. In the first step a request for a sharing of content is received, for example by a cellular phone service provider. The request contains USER IDs of the two participants, to enable the service provider to determine their location in his network. Similar to the aforementioned situations the USER IDs may also include an indication of the kind of content. First the service provider has to check if one of the two participants is in possession of the rights to access the content. If that is not found true, authorization is denied. Otherwise the provider checks the locations of the two users in his network. If the two locations are found to be in a predetermined area, e.g. one network cell of the cellular network, the authorization to access the content is sent to the listener. A cyclic repetition of that step is performed (here every 30 seconds), to ensure that both users stay in the predetermined area, i.e. close to one another. If at some time this is not the case any longer, authorization is denied.

Playback or access, respectively, may be stopped in different manners. The holder (4, H) could manually call back the key, i.e. signal that he no longer wishes to lend the content, and instruct the listeners playback device to delete the key. Other possibilities are to restrict the listeners playback to either a certain number of times the content may be played back (1 time for example), or a certain amount of time after which the listener is not allowed to use the content anymore (10 minutes for example). Or the sharing could last until the player software is closed or the playback device is shut off. Sharing and querying required rights may either be done automatically, for example allowing everyone in range to listen to a content, or the holder may manually choose which persons he wants to allow participating in a sharing process.

A special software must be used in the present invention, on both holder and listener side, that ensures that use of the necessary decryption key is strictly restricted to cases in which the condition received together with the key is fulfilled. The software also has to be able to pass rights in a secure way preventing that a malicious user is able to fake a confirmation of owning the rights for playback. In other words, the devices of both holder and listener must be closed systems. Otherwise calling back a sent key for example would not be possible.

The holders player software acts as a kind of server in embodiments of the present invention, serving listeners who are requesting sharing of content.

In an embodiment as illustrated in FIG. 6, similar arguments apply to the service provider, who also has to use a similar kind of software enabling him to pass rights in a secure way and call them back if necessary.

The inventive method for sharing DRM-protected content also has advantages for the content owner. Data concerning the sharing process may be sent to the owner. Since in most cases it is necessary or at least convenient for the holder to know the identity of the persons he shares content with (USER ID), it is thus possible to identify the persons having borrowed a content. Statistical data may easily be gathered on how many persons have listened to a certain song for example, or how often they have played back the song. The copyright owner can thus either charge the holder for sharing of the content, or offer him a compensation for introducing potential new customers. This may serve as a sophisticated way of advertising. In this case the owner has the possibility to make specialized offers to the listeners, for example reduced prices for purchasing permanent access rights. The listeners already perform a kind of rating by lending content, but it is also easily possible to get a listeners feedback, for example by sending a rating signal to the holder. Thus the present invention offers great marketing potential to copyright owners.

A very good implementation for sharing connections are range-limited connection methods. Bluetooth or like wireless connection technologies (RFID/infra-red) include a "natural" restriction through their limited maximum range, in the case of infra-red connection even that both participants are in a line of sight. Placing holder and listeners into the same physical location sure is the typical and most desired sharing situation. But the invention is not restricted to local connections. The inventive sharing model may also be applied to other suitable transportation methods like TCP/IP-internet connections, GPRS or the like. Such non-local connections may not be as user-friendly as a bluetooth connection and may eventually need stricter precautions against copyright violations.

Even when the communication channel is non-local, location based services like GSM can be employed to verify that all participants in the sharing process are in the same place. The latter offers the possibility to the copyright owner to authorize access to a content based on participants and a copyright holder being in a certain location. That could be done by establishing a connection to the owner by a device of a person willing to get shared a certain content. This person then would have to indicate the he/she is in close proximity of a holder. The owner could then grant a listener access to the content based on that proximity condition.

The invention claimed is:

1. Method for sharing content protected by digital rights management (DRM) between a first mobile electronic terminal device and a second mobile electronic terminal device, wherein said first mobile electronic terminal device is authorized for accessing said content, comprising:
   receiving a request for sharing said content from said second mobile electronic terminal device;
   answering said request by sending
      a confirmation to said second mobile electronic terminal device about authorization of said first mobile electronic terminal device to access said content;
      a data signal based on said authorization to said second mobile electronic terminal device and indicative of at least one condition said second mobile electronic terminal device has to meet in order to be authorized for accessing said content;
   wherein a key for accessing said content is provided in said first mobile electronic terminal device, further comprising:
      receiving a clock synchronization signal from said second mobile electronic terminal device;
      generating a plurality of keys $k_i$ derived from said key, wherein said keys $k_i$ are suitable to partially access said content; and
      sending said keys $k_i$ to said second mobile electronic terminal device in accordance with said clock synchronization signal.

2. Method according to claim 1, wherein said content is provided in said first mobile electronic terminal device, further comprising:
   sending said content to said second mobile electronic terminal device.

3. Computer readable storage medium comprising program code stored thereon for carrying out the method of claim 1 when said program code is run on a computer or network device.

4. Method for sharing content protected by digital rights management DRM between a first mobile electronic terminal device and a second mobile electronic terminal device, wherein said first mobile electronic terminal device is authorized for accessing said content, comprising:
   sending a request for sharing of said content to said first mobile electronic terminal device;
   receiving from said first mobile electronic terminal device in response to said request
      a confirmation about authorization of said first mobile electronic terminal device to access said content;
      a data signal indicative of at least one condition said second mobile electronic terminal device has to meet in order to be authorized to access said content; and
      authorizing access to said content based on said confirmation and said condition being repeatedly met and denying authorization of access to said content
      if said condition is not met for a predetermined time; or
      if not meeting said condition has occurred a predetermined number of times.

5. Method according to claim 4, further comprising:
   receiving said content from said first mobile electronic terminal device.

6. Method according to claim 4, wherein said confirmation comprises a key for accessing said content.

7. Method according to claim 4, wherein said request comprises a user identification of said second mobile electronic terminal device.

8. Method according to claim 4, wherein said at least one condition is said second mobile electronic terminal device having a network connection with said first mobile electronic terminal device.

9. Method according to claim 8, wherein said network connection is a wireless connection.

10. Method according to claim 4, wherein said at least one condition is said second mobile electronic terminal device not exceeding a predetermined number of accesses to said content.

11. Method according to claim 4, wherein said at least one condition is said second mobile electronic terminal device not exceeding a predetermined time of access to said content.

12. Method for sharing content protected by digital rights management (DRM) between a first mobile electronic terminal device and a second mobile electronic terminal device, wherein said first mobile electronic terminal device is authorized for accessing said content, and said mobile electronic terminal devices are part of a location based service network, comprising:

receiving a request for sharing of said content from said second mobile electronic terminal device, said request containing an identification of said second mobile electronic terminal device, and an identification of said first mobile electronic terminal device;

comparing the location of said first mobile electronic terminal device and the location of said second mobile electronic terminal device in said network based on said identifications; and     sending an authorization to access said content to said second mobile electronic terminal device if said locations of said two mobile electronic terminals are in a predetermined area.

13. Method according to claim 12, wherein said authorization comprises a key to access said content.

14. Method according to claim 12, further comprising:

performing cyclic repeats of said comparing of said locations of said two mobile electronic terminals; and     denying authorization to access said content if said locations of said two mobile electronic terminals are not in a predetermined area.

15. Mobile electronic terminal device for sharing content protected by digital rights management (DRM) with a second mobile electronic terminal device, wherein said mobile electronic terminal device may be authorized for accessing said content, comprising:

a component adapted for transceiving data; and a component for generating a data signal;

wherein said data signal generating component is adapted to generate a data signal indicative of at least one condition said second mobile electronic terminal device has to meet to be authorized for access to said content and being based on said authorization of said mobile electronic terminal device to access said content, and said transceiving component is adapted to send said data signal to said second mobile electronic terminal device;

wherein a key for accessing said content is provided in said mobile electronic terminal device;

said mobile electronic terminal device further comprising a component adapted to generate a plurality of keys $k_i$ derived from said key, wherein each of said keys $k_i$ is suitable to partially access said content;

wherein said transceiving component is adapted to receive a clock synchronization signal from said second mobile electronic terminal device and send said keys $k_i$ to said second mobile electronic terminal device in accordance with said clock synchronization signal.

16. Device according to claim 15, further comprising a component adapted to send said content to said second mobile electronic terminal device.

17. Device according to claim 15, wherein said transceiving component comprises a local area network transceiver.

18. Device according to claim 15, wherein said transceiving component comprises a wide area network transceiver.

19. Mobile electronic terminal device for sharing content protected by digital rights management (DRM) from a first mobile electronic terminal device, wherein said first mobile electronic terminal device may be authorized for accessing said content, comprising:

a component adapted for transceiving data;

an authorization component; and a component adapted to send a clock synchronization signal;

wherein said transceiving component is adapted to receive a data signal indicative of a condition, and said authorization component is adapted to authorize access to said content based on said condition being met; and     wherein said transceiving component is further adapted to receive keys $k_i$ in accordance to said clock synchronization signal and said authorization component is further adapted to authorize access to said content based on said keys $k_i$.

20. Device according to claim 19, further comprising a component adapted to receive said content.

* * * * *